US012767433B2

(12) United States Patent
Tremblay

(10) Patent No.: US 12,767,433 B2
(45) Date of Patent: Oct. 20, 2026

(54) FOOT OPERATED GARBAGE BIN LID OPENING SYSTEM

(71) Applicant: David Tremblay, Alma (CA)

(72) Inventor: David Tremblay, Alma (CA)

( * ) Notice: Subject to any disclaimer, the term of this patent is extended or adjusted under 35 U.S.C. 154(b) by 0 days.

(21) Appl. No.: 19/218,433

(22) Filed: May 26, 2025

(65) Prior Publication Data

US 2025/0361081 A1 Nov. 27, 2025

(30) Foreign Application Priority Data

May 27, 2024 (GB) ..................................... 2407507

(51) Int. Cl.

*B65F 1/16* (2006.01)
*B65F 1/02* (2006.01)
*B65F 1/14* (2006.01)

(52) U.S. Cl.

CPC ................ *B65F 1/163* (2013.01); *B65F 1/02* (2013.01); *B65F 1/1473* (2013.01); *B65F 1/1646* (2013.01)

(58) Field of Classification Search

CPC .......... B65F 1/163; B65F 1/02; B65F 1/1473; B65F 1/1646

See application file for complete search history.

(56) References Cited

U.S. PATENT DOCUMENTS

| | | | | |
|---|---|---|---|---|
| 4,892,218 A | | 1/1990 | Reiling | |
| 6,039,200 A | * | 3/2000 | Armor .................... | B65F 1/163 220/908 |
| 7,070,064 B1 | | 7/2006 | Henry et al. | |
| 11,155,406 B2 | * | 10/2021 | Lavigne .................. | B65F 1/163 |
| 2003/0183633 A1 | | 10/2003 | Pope | |
| 2013/0134167 A1 | | 5/2013 | Burleson | |

FOREIGN PATENT DOCUMENTS

DE 102016003698 B4 * 4/2021 .............. B65F 1/163

* cited by examiner

*Primary Examiner* — James N Smalley

(57) ABSTRACT

A foot-operated lid opening system for a bin, utilizing a stirrup connected by at least one actuating strap to at least one lifting device. Each lifting device features a bracket with a slitted hemisphere and a substantially fixed spring attachment plate; this plate includes a central pillar and at least one cavity. A lifting arm assembly, comprising a lifting arm with an integral ball joint and stub, has its stub passing through the slit to engage the cavity. A torsion spring, mounted on the pillar, biases the lifting arm towards a lid-closed position. Foot actuation pulls the strap, pivoting the lifting arm via the stub's engagement to open the lid with a lifting pin. A key aspect is its ambidextrous design, enabling left or right-side bin mounting. This is achieved through a rotatable stub, a flippable lifting arm with a double-sided pin, and typically multiple cavities on the spring attachment plate.

11 Claims, 4 Drawing Sheets

FOOT OPERATED GARBAGE BIN LID OPENING SYSTEM

CROSS-REFERENCE TO RELATED APPLICATIONS

The present application claims priority to application number GB2407507.9, filed on May 27, 2024, the disclosure of which is hereby incorporated in its entirety at least by reference.

BACKGROUND OF THE INVENTION

1. Field of the Invention

The present invention relates generally to garbage disposal but more particularly to a foot operated garbage bin lid opening system.

2. Description of Related Art

The seemingly simple act of discarding trash into a large lidded bin often becomes a minor ballet of inconvenience, especially when one's hands are already full: The multi-step process of depositing trash, opening the lid, re-hoisting the refuse, and finally, the often-awkward retrieval of a lid that has swung fully behind the bin. This isn't just about wasted motion; it's about hygiene (touching a potentially dirty lid then re-handling trash bags), physical strain (especially with heavy or awkward items), and the simple annoyance of a poorly designed everyday interaction.

Current solutions, while attempting to address this, often fall short of ideal:

1. Foot Pedals: Many large bins now feature foot pedals. While a step in the right direction for hands-free opening, they are frequently flimsy for the weight of larger lids, requiring significant force, or they don't lift the lid fully. Moreover, many are spring-loaded to slam shut quickly, sometimes before one has even finished depositing the trash, and they offer no solution for the lid pivoting too far back.
2. Propping the Lid Open: Users sometimes resort to propping the lid open with a brick, a stick, or by wedging it against a wall. This defeats the purpose of a lidded bin—to contain odors, deter pests, and keep out rain—rendering it an open invitation for problems.
3. The "Elbow/Knee Nudge": In a pinch, people might try to nudge the lid open with an elbow, knee, or hip while balancing their load. This is awkward, potentially unhygienic, and not always effective, especially with heavier or stiff-hinged lids.
4. Makeshift Lid Retrievers: For lids that swing too far back, some users might attach a piece of rope or wire to make retrieval easier without reaching fully behind the bin. This is a DIY fix that highlights the design flaw rather than solving it elegantly.
5. Leaving Lids Ajar: Similar to propping, some simply don't close the lid fully, leaving a gap. This offers minimal improvement over a fully open bin regarding pest and odor control.

These workarounds underscore a persistent design challenge: creating a large, robust, yet easily and hygienically operable garbage bin lid that gracefully returns to a closed position without user intervention. There has to be a simpler way of throwing trash in a bin.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is a main object of the present disclosure to provide for a foot operated garbage bin lid opening system.

In order to do so, the present invention provides for a foot-operated lid opening system for a bin having a lid. The system includes a stirrup configured for foot actuation. At least one actuating strap is operatively connected to the stirrup. The system further includes at least one lifting device configured for mounting to the bin.

In some embodiments, each such lifting device features a bracket for attachment to the bin. This bracket includes a generally hemispherical portion with a slit extending through it. A spring attachment plate is substantially fixed relative to the bracket and comprises a central pillar and at least one receiving cavity. A lifting arm assembly, comprising a lifting arm and a connected ball joint, is also part of the lifting device. The ball joint has an integral stub extending from it. This stub passes through the slit of the hemispherical portion and is configured to engage the at least one receiving cavity on the spring attachment plate. A torsion spring is mounted about the central pillar. It is operatively connected between the spring attachment plate and the lifting arm to bias the lifting arm towards a lid-closed position. A lifting pin is located at a distal end of the lifting arm and is configured to engage and lift the lid. The at least one actuating strap is attached to an attachment point on the lifting arm. Tension on this actuating strap causes the lifting arm assembly to pivot relative to the bracket and against the bias of the torsion spring.

In a further embodiment of the system described above, for each the lifting device, the at least one receiving cavity on the spring attachment plate is one of at least two such cavities. In this embodiment, the lifting pin is a double-sided lifting pin. Furthermore, the lifting arm can be flipped, and the stub can be rotated approximately 180 degrees to selectively engage one of the at least two receiving cavities on the spring attachment plate. This allows the lifting device to be configured for either left-hand or right-hand operation on the bin.

According to another feature, the system may further include a pocket configured for attachment to a rim portion of the bin. The bracket is slidably received and securable within this pocket by a threaded knob having a threaded shaft passing through an aperture in the pocket and engaging a threaded aperture in the bracket.

In certain configurations, the system comprises a single the lifting device. In such cases, the stirrup is operatively connected to the single lifting device via a single actuating strap or, alternatively, via two actuating straps wherein one strap is connected to an anchor point.

In other configurations, the system comprises two the lifting devices. One lifting device is configured for mounting on a left side of the bin and the other for mounting on a right side of the bin. In this arrangement, the stirrup is operatively connected to both lifting devices via a pair of actuating straps.

Optionally, the spring attachment plate may further comprise a blocker member, and the lifting arm may comprise a limit pin. The blocker member is positioned to interact with the limit pin to limit a range of rotational displacement of the lifting arm.

In embodiments featuring at least two receiving cavities, the selection of one of these cavities for engagement by the stub can adjust a pre-tension of the torsion spring.

In another aspect, the disclosure provides an ambidextrous lifting device for a foot-operated bin lid opening system. This lifting device includes a bracket for attachment to a bin, the bracket having a generally hemispherical portion with a slit extending through it. A spring attachment plate is substantially fixed relative to the bracket and comprises a central pillar and at least two receiving cavities. The device also features a lifting arm assembly with a lifting arm and a connected ball joint. The ball joint has an integral stub extending from it, which passes through the slit and selectively engages one of the at least two receiving cavities. A torsion spring is mounted about the central pillar and operatively connected between the spring attachment plate and the lifting arm to bias the lifting arm towards a non-actuated position. A double-sided lifting pin is provided at a distal end of the lifting arm. For ambidextrous configuration, the lifting arm can be flipped relative to the bracket, and the stub can be rotated approximately 180 degrees relative to the spring attachment plate to re-engage one of the at least two receiving cavities. This permits configuration of the lifting device for either left-hand or right-hand operation on the bin.

In such an ambidextrous lifting device, the spring attachment plate may also include a blocker member configured to interact with a limit pin on the lifting arm to limit the range of rotational displacement of the lifting arm.

A method of operating a garbage bin lid using a lid opening system is also disclosed. The method involves providing the lid opening system as described in the preceding embodiments, with at least one lifting device mounted to the bin. A downward force is applied to the stirrup. This force is transmitted via the at least one actuating strap to the attachment point on the lifting arm of the at least one lifting device, causing the lifting arm assembly to pivot upwardly relative to the bracket against the bias of the torsion spring. The lid of the bin is engaged with the lifting pin to open the lid. Upon releasing the downward force from the stirrup, the torsion spring biases the lifting arm assembly downwardly, thereby closing the lid.

In one variation of this method, providing the lid opening system involves providing a system with a single the lifting device. Transmitting the force then comprises pulling an actuating strap connected between the stirrup and the attachment point of the single lifting device.

Further disclosed is a method of configuring a lifting device of the ambidextrous system embodiment for operation on a bin. This method includes rotating the stub of the ball joint by approximately 180 degrees. One of the at least two receiving cavities on the spring attachment plate is selected, corresponding to a desired left-hand or right-hand configuration. The rotated stub is then engaged within the selected cavity such that the stub also passes through the slit in the hemispherical portion of the bracket. The lifting arm is oriented by flipping it so that an appropriate side of the double-sided lifting pin is positioned to engage the lid.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which:

FIG. 3C Top view of the invention, according to a preferred embodiment of the invention.

FIG. 4A Top view of the ball joint, according to a preferred embodiment of the invention.

FIG. 5A Top view of the strap attachment member, according to a preferred embodiment of the invention.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein.

It is to be understood that the terminology used herein is for the purpose of describing particular embodiments only and is not intended to be limiting. The terms “a” or “an,” as used herein, are defined as to mean “at least one”. The term “plurality,” as used herein, is defined as two or more. The term “another,” as used herein, is defined as at least a second or more. The terms “including” and/or “having,” as used herein, are defined as comprising (i.e., open language). The term “coupled,” as used herein, is defined as connected, although not necessarily directly, not necessarily mechanically, and not permanent. The term “providing” is defined herein in its broadest sense, e.g., bringing/coming into physical existence, making available, and/or supplying to someone or something, in whole or in multiple parts at once or over a period of time. As used herein, the terms “about”, “generally”, or “approximately” apply to all numeric values, whether or not explicitly indicated. These terms generally refer to a range of numbers that one of skill in the art would consider near the stated amount by about 0%, 5%, or 10%, including increments therein. In many instances these terms may include numbers that are rounded to the nearest significant figure.

Referring now to the accompanying FIGURES, wherein like numerals refer to like parts throughout the several views, there is provided a foot-operated garbage bin lid opening system 10, for use on a bin 12 having a lid 30.

Figures 1A, 1B, 1C:
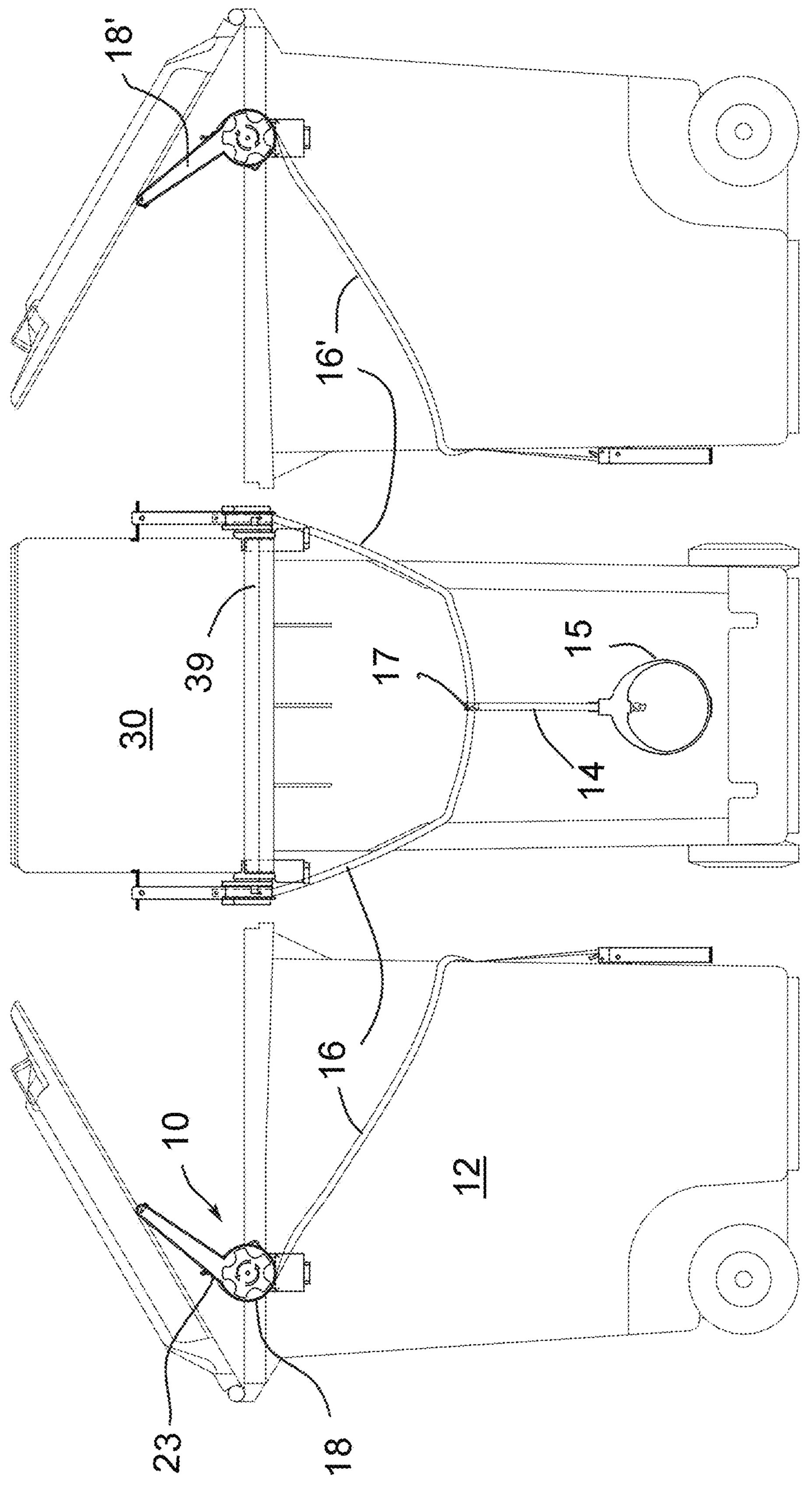
FIG. 1A Side view of the invention installed on a bin, according to a preferred embodiment of the invention.
FIG. 1B Front view, according to a preferred embodiment of the invention.
FIG. 1C Opposite side view of the invention, according to a preferred embodiment of the invention.

As depicted in FIGS. 1A-1C, the system 10 comprises a foot-actuatable stirrup 15. A length-adjustable stirrup strap 14 is attached at a first end to the stirrup 15. The opposite end of the stirrup strap 14 connects to a strap connector clip 17. The strap connector clip 17, in a typical dual-sided configuration, connects to a pair of actuating straps 16, 16'. Each actuating strap 16, 16' extends to one of two lifting devices 8,18'', respectively, with each lifting device being located on a respective side of the bin 12.

Figure 2:
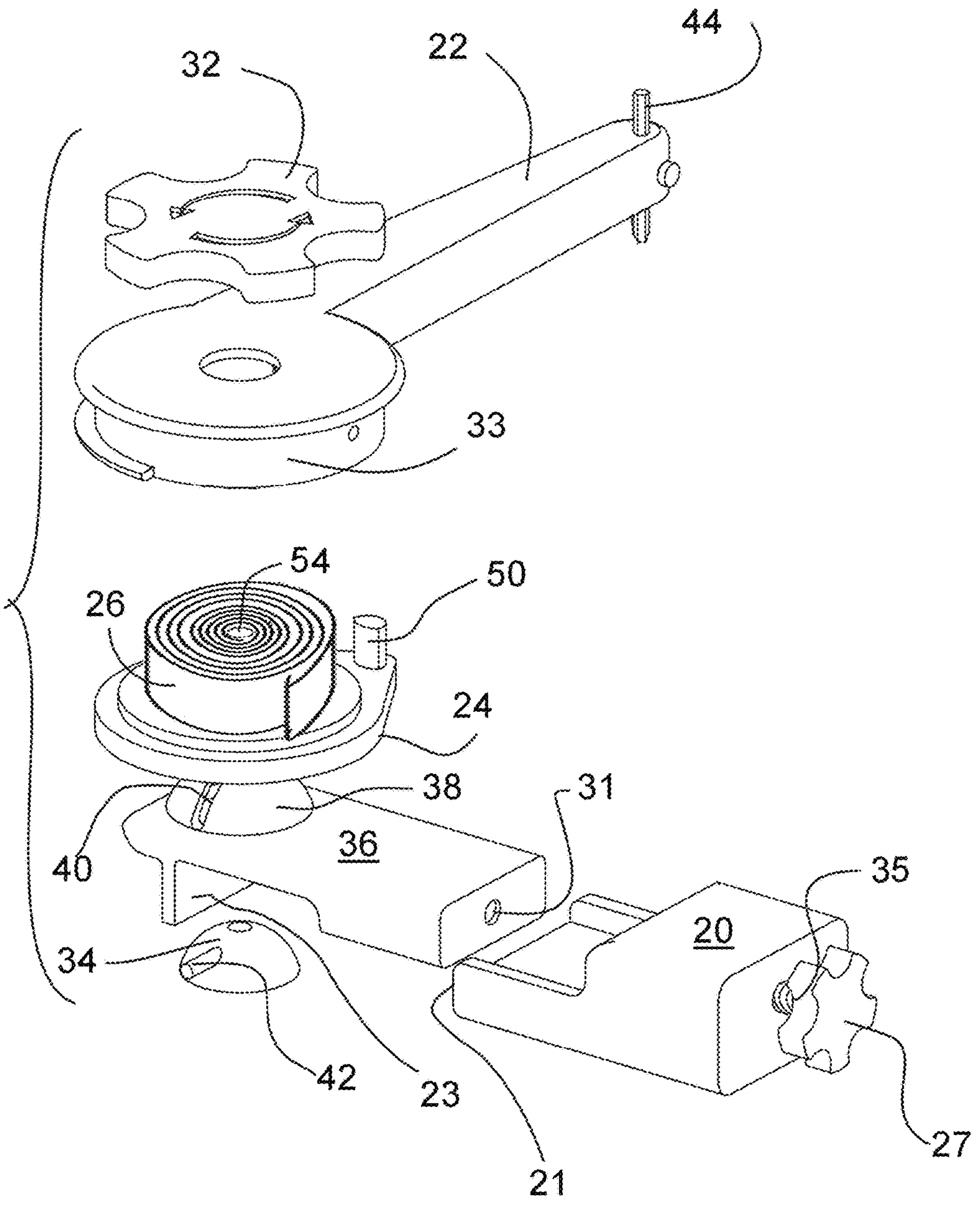
FIG. 2 Exploded view of the invention, according to a preferred embodiment of the invention.
Figure 3A:
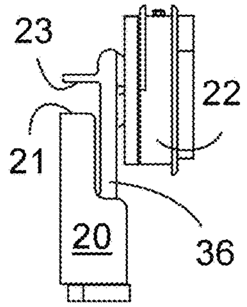
FIG. 3A Front view of the invention, according to a preferred embodiment of the invention.

Each lifting device 18, 18', an exemplary one shown in detail in FIG. 2, includes a mounting assembly for attachment to the bin 12. This mounting assembly comprises a pocket 20 configured to be mechanically fastened to a rim portion 38 of the bin 12. The pocket 20 may feature an edge portion 21 facilitating the fastening. A bracket 36 is configured to be slidably received within the pocket 20. The bracket 36 can be secured within the pocket 20 by a threaded knob 27. The threaded knob 27 includes a threaded shaft 35 (FIG. 2) that passes through an aperture 31' in the pocket 20 and engages a threaded aperture 31 located at a bottom portion of the bracket 36. The bracket 36 may further include a pressure tab 23 (FIGS. 2, 3A) extending generally perpendicularly therefrom, configured to abut a surface of the bin 12 for stability.

Figure 4A:
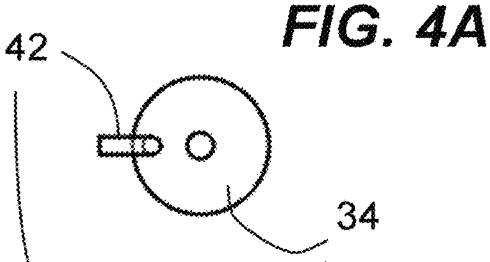
Figure 4B:
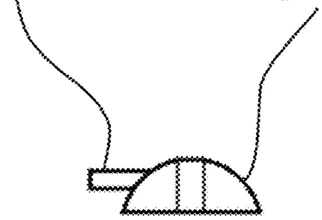
FIG. 4B Side view of the ball joint, according to a preferred embodiment of the invention.

The bracket 36 features an integral hemisphere portion 38 (FIG. 2). A slit 40 extends across the hemisphere 38, typically from one edge to an opposite edge thereof. A lifting arm assembly is pivotally associated with the bracket 36. This assembly includes a lifting arm 22 and a ball joint 34 (FIGS. 2, 4A, 4B). An integral stub 42 extends from the ball joint 34. The stub 42 is configured to pass through the slit 40 in the hemisphere 38.

Figure 5A:
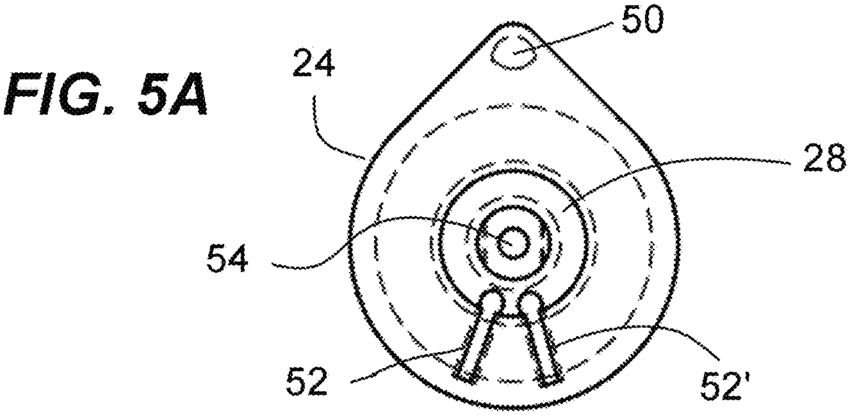
Figure 5B:
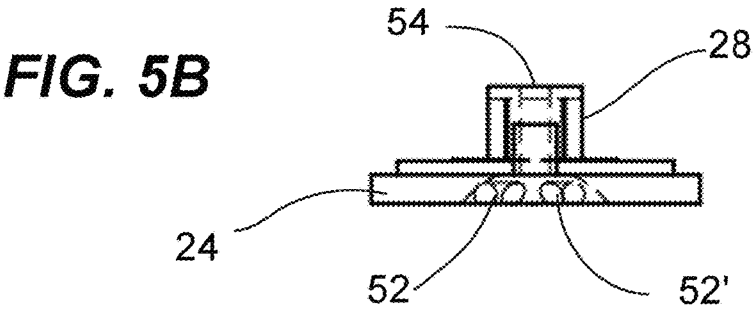
FIG. 5B Side view of the strap attachment member, according to a preferred embodiment of the invention.

A spring attachment plate 24 (FIGS. 2, 5A, 5B) is disposed proximate to the hemisphere 38 and is substantially fixed relative to the bracket 36 during operation. The spring attachment plate 24 comprises a central pillar 28. A torsion spring 26 is mounted about the central pillar 28. An inner end of the torsion spring 26 is configured to be anchored within a slit or recess (not explicitly shown) in the central pillar 28. An outer end of the torsion spring 26 engages a spring engagement feature 58 located on the lifting arm 22. The lifting arm 22, the spring attachment plate 24 (via its central pillar 28), and the ball joint 34 are assembled together. A locking knob 32 passes through the lifting arm 22 and a centrally located opening 54 in the central pillar 28 of the spring attachment plate 24, and threadedly engages the ball joint 34 (or a component thereof), thereby connecting these parts such that the lifting arm 22 (with ball joint 34) can pivot relative to the fixed spring attachment plate 24 and bracket 36, loading or unloading the torsion spring 26. The torsion spring 26 is configured to bias the lifting arm 22 towards a position that corresponds to the lid 30 being closed.

Figure 3B:
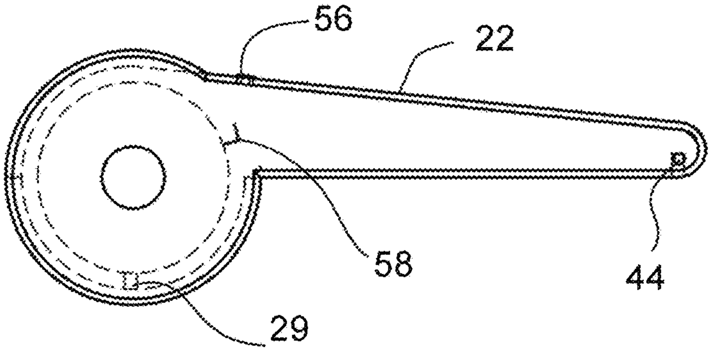
FIG. 3B Side see through view of the lifting arm, according to a preferred embodiment of the invention.
Figure 3C:
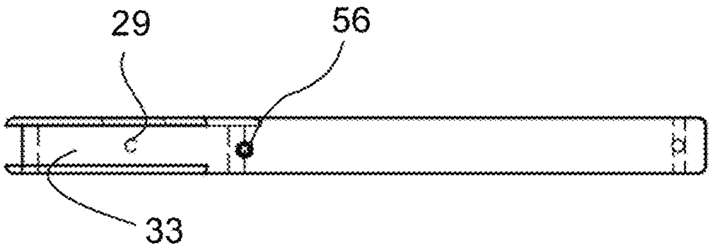
Figure 3D:
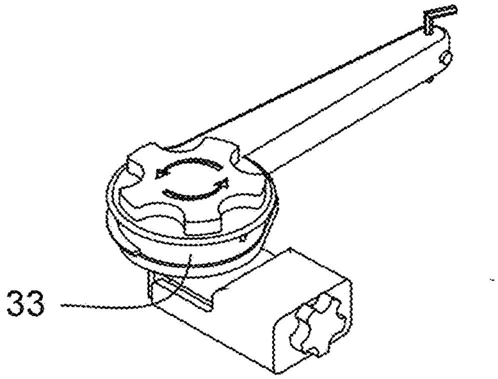
FIG. 3D Isometric view of the invention, according to a preferred embodiment of the invention.

At a distal end of the lifting arm 22, a lifting pin 44 is provided, which is configured to engage and lift the lid 30 of the bin 12. The actuating straps 16, 16 are attached to the lifting arm 22 at an attachment point 56 on the arm in FIG. 3B/3C. The straps 16, 16' may pass through a strap track 33 (FIGS. 2, 3C, 3D) formed on or associated with the lifting arm 22 en route to the attachment point 56.

The system 10 is designed for ambidextrous configuration, allowing the same parts to be re-arranged for use on either the left or right side of the bin 12. To facilitate this, the lifting pin 44 is a double-sided pin, extending from both sides of the lifting arm 22. The lifting arm 22 can thus be flipped. The ball joint stub 42 can be re-positioned by rotating it 180 degrees and still pass through the slit 40 in the hemisphere 38. The spring attachment plate 24, although described as substantially fixed during operation, can be oriented during initial assembly. The ball joint stub 42 is configured to engage one of two cavities 52, 52' (FIGS. 2, 5A, 5B) located on the spring attachment plate 24. The choice of cavity 52 or 52' and the orientation of the spring attachment plate 24 can be determined during assembly to suit left or right-hand configuration and potentially adjust spring pre-tension. This configuration allows for cost reduction by avoiding separate left and right-specific molded parts. The components are designed for ease of assembly, disassembly, and substitution by an end-user.

The spring attachment plate 24, being substantially fixed relative to the bracket 36, also features a blocker member 50 (FIGS. 2, 5A) positioned to interact with a limit pin 29 which limits the range of rotational displacement of the lifting arm 22, for instance, to prevent the lid 30 from flipping beyond a desired angle (e.g., 90 degrees).

In a preferred mode of operation, a user presses downward on the stirrup 15 with their foot. This action pulls on the stirrup strap 14 and consequently on the actuating strap(s) 16 (and 16' if present). The tension in the strap(s) 16, passing through the strap track 33, pulls on the attachment point 56 of the lifting arm 22. This force causes the lifting arm 22 to rotate upwards around its pivot axis defined by the ball joint 34 and its interaction with the hemisphere 38. As the lifting arm 22 rotates, the lifting pin 44 engages and opens the lid 0. This rotation also further tensions the torsion spring 26. Upon release of the foot pressure from the stirrup 15, the stored energy in the torsion spring 26 rotates the lifting arm 22 back to its resting position, thereby closing the lid 30.

While the invention is illustrated with two lifting devices 10 (referring to the overall system, but likely meaning two lifting devices 18, 18', one on each side of the bin 12, it is also contemplated that a single lifting device 18 may be used. In such a single-device configuration, to maintain the stirrup 15 at a practical central front position of the bin, one actuating strap (e.g., 16) would be connected to the attachment point 56 of the single lifting device 18, while the other strap (e.g., 16') could be connected to a simple hook or anchor point (not shown) on the opposite side of the bin or on the lifting device itself if designed to accommodate such. Alternatively, for a single device setup, the stirrup 15 and stirrup strap 14 could be located on the side of the bin 12 more directly aligned with the single lifting device.

Although the invention has been described in considerable detail in language specific to structural features, it is to be understood that the invention defined in the appended claims is not necessarily limited to the specific features described. rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A foot-operated lid opening system for a bin having a lid, the system comprising:

a stirrup configured for foot actuation;

at least one actuating strap operatively connected to the stirrup;

at least one lifting device configured for mounting to the bin, the at least one lifting device comprising:

a bracket configured for attachment to the bin, the bracket including a hemisphere portion having a slit extending therethrough;

a spring attachment plate substantially fixed relative to the bracket, the spring attachment plate comprising a central pillar and at least one cavity;

a lifting arm assembly comprising a lifting arm and a ball joint connected thereto, the ball joint having an integral stub extending therefrom, wherein the stub passes through the slit of the hemisphere portion and is configured to engage the at least one cavity on the spring attachment plate;

a torsion spring mounted about the central pillar and operatively connected between the spring attachment plate and the lifting arm to bias the lifting arm towards a lid-closed position; and a lifting pin at a distal end of the lifting arm, configured to engage and lift the lid;

wherein the at least one actuating strap is attached to an attachment point on the lifting arm such that tension on the actuating strap causes the lifting arm assembly to pivot relative to the bracket and against the bias of the torsion spring.

2. The system of claim 1, wherein for the at least one lifting device:

the at least one cavity on the spring attachment plate is one of at least two cavities;

the lifting pin is a double-sided lifting pin; and the lifting arm is configured to be flipped, and the stub is configured to be rotated approximately 180 degrees to selectively engage one of the at least two cavities on the spring attachment plate, thereby allowing the lifting device to be configured for either left-hand or right-hand operation on the bin.

3. The system of claim 1, further comprising a pocket configured for attachment to a rim portion of the bin, wherein the bracket is slidably received and securable within the pocket by a threaded knob having a threaded shaft passing through an aperture in the pocket and engaging a threaded aperture in the bracket.

4. The system of claim 1, wherein the at least one lifting device comprises a single lifting device, and wherein the stirrup is operatively connected to the single lifting device via a single actuating strap or via two actuating straps, wherein one of said single actuating strap or said two actuating straps is connected to an anchor point.

5. The system of claim 1, wherein the system comprises two lifting devices, one configured for mounting on a left side of the bin and one configured for mounting on a right side of the bin, and wherein the stirrup is operatively connected to both lifting devices via a pair of actuating straps.

6. The system of claim 1, wherein the spring attachment plate further comprises a blocker member, and the lifting arm comprises a limit pin, wherein the blocker member is positioned to interact with the limit pin to limit a range of rotational displacement of the lifting arm.

7. An ambidextrous lifting device for a foot-operated bin lid opening system, the lifting device comprising:

a bracket configured for attachment to a bin, the bracket including a hemisphere portion having a slit extending therethrough;

a spring attachment plate substantially fixed relative to the bracket, the spring attachment plate comprising a central pillar and at least two cavities;

a lifting arm assembly comprising a lifting arm and a ball joint connected thereto, the ball joint having an integral stub extending therefrom, wherein the stub is configured to pass through the slit of the hemisphere portion and to selectively engage one of the at least two cavities on the spring attachment plate;

a torsion spring mounted about the central pillar and configured to be operatively connected between the spring attachment plate and the lifting arm to bias the lifting arm towards a non-actuated position; and a double-sided lifting pin at a distal end of the lifting arm;

wherein the lifting arm is configured to be flipped relative to the bracket, and the stub is configured to be rotated approximately 180 degrees relative to the spring attachment plate to re-engage one of the at least two cavities, to permit configuration of the lifting device for either left-hand or right-hand operation on the bin.

8. The lifting device of claim 7, wherein the spring attachment plate further comprises a blocker member configured to interact with a limit pin on the lifting arm to limit a range of rotational displacement of the lifting arm.

9. A method of operating a garbage bin lid using a lid opening system, the method comprising the steps of:

providing the lid opening system of claim 1, comprising at least one lifting device mounted to the bin;

applying a downward force to the stirrup;

transmitting the force via the at least one actuating strap to the attachment point on the lifting arm of the at least one lifting device, thereby causing the lifting arm assembly to pivot upwardly relative to the bracket against the bias of the torsion spring;

engaging the lid of the bin with the lifting pin to open the lid;

releasing the downward force from the stirrup; and allowing the torsion spring to bias the lifting arm assembly downwardly, thereby closing the lid.

10. The method of claim 9, wherein the lid opening system comprises a system with a single lifting device, and wherein transmitting the force comprises pulling an actuating strap connected between the stirrup and the attachment point of the single lifting device.

11. A method of configuring a lifting device of the system of claim 2 for ambidextrous operation on a bin, the method comprising:

rotating the stub of the ball joint by approximately 180 degrees;

selecting one of the at least two cavities on the spring attachment plate corresponding to a desired left-hand or right-hand configuration;

engaging the rotated stub within the selected cavity such that the stub also passes through the slit in the hemisphere portion of the bracket; and orienting the lifting arm by flipping it such that an appropriate side of the double-sided lifting pin is positioned to engage the lid.

* * * * *